INVENTOR/S
CLARENCE C. BRESTEL &
HOWARD R. MASCHINOT,

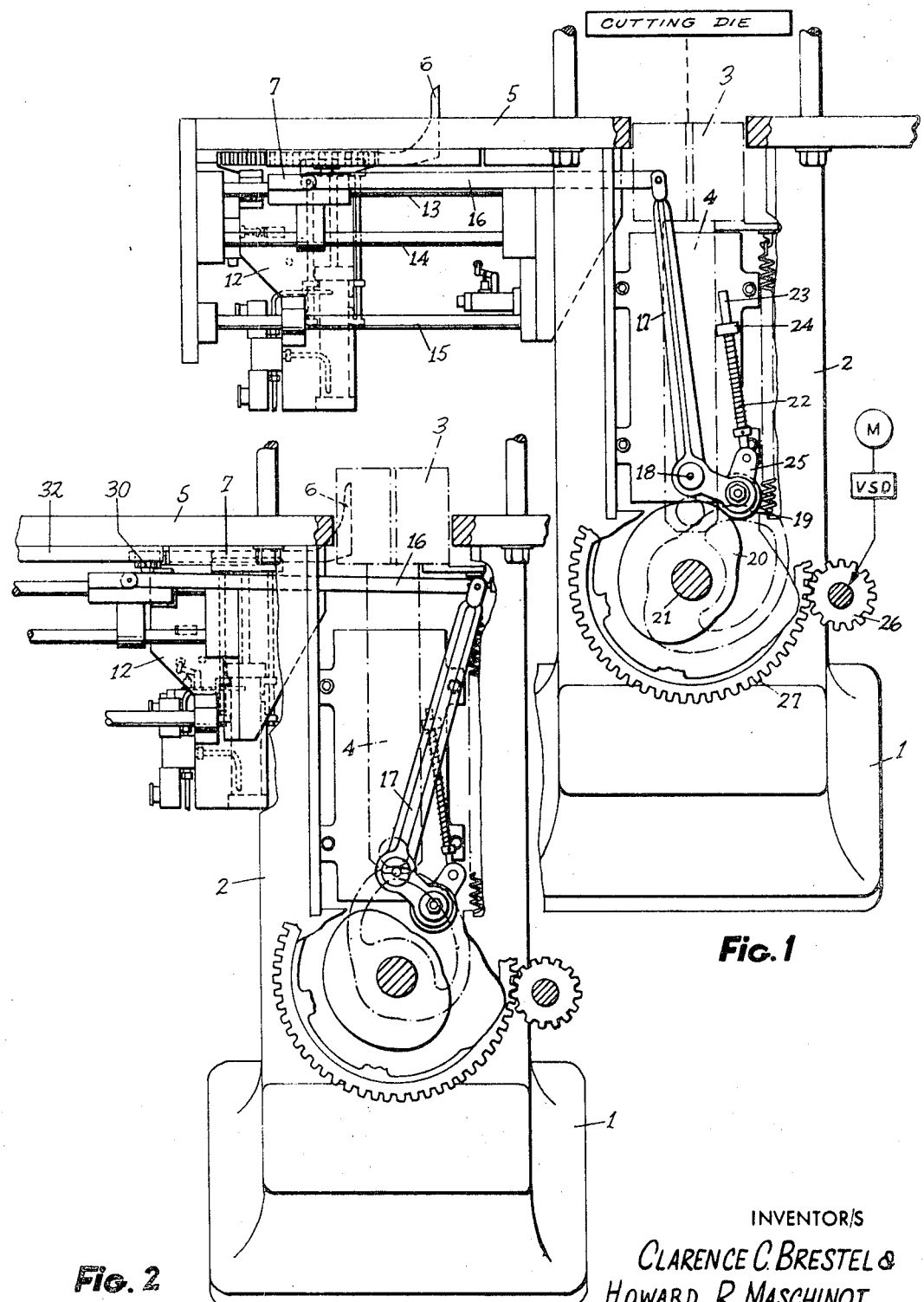

BY Melville, Strasser, Foster and Hoffman
ATTORNEYS

United States Patent Office 3,468,200
Patented Sept. 23, 1969

3,468,200
LABEL DIE CUTTING MACHINE
Clarence C. Brestel, Cincinnati, Ohio, and Howard R. Maschinot, Erlander, Ky., assignors to The Printing Machinery Company, Cincinnati, Ohio, a corporation of Ohio
Filed Apr. 14, 1967, Ser. No. 630,989
Int. Cl. B26d 5/00, 5/20, 7/06
U.S. Cl. 83—62          3 Claims

ABSTRACT OF THE DISCLOSURE

A label die cutting machine having a label feed mechanism including a pusher which drops below the level of the feed table prior to its return to pushing position and then projects into pushing position for the start of a succeeding pushing stroke. Mechanism is provided to increase the length and speed of the stroke of the pushing device and the machine is equipped with a variable speed drive so that the machine can operate at a speed appropriate to the type of labels being cut.

Background of the invention

The invention pertains to feed mechanisms for feeding a stack of labels which are to be die cut from a loading position to a cutting position. In particular it relates to the mechanism for increasing the speed and length of the stroke of the label pusher and the means for retracting and projecting the pusher.

The basic machine to which the invention is directed is similar to that shown in the Brestel and Maschinot patent, No. 3,290,977. A machine such as this usually consists of a table with an anvil which may operate through the table to lift a stack of labels thereon and push them through a cutting die positioned above the table. The anvil is lifted by means of a cam driven by the main motor of the machine. The main motor of the machine also produces reciprocation of a pusher element which pushes a stack of labels from a loading position to a position on the anvil for cutting. Such machines in the past have operated at a constant speed and this speed has generally been slow enough for an operator to handle the most complex labels which it may be necessary to handle. Thus, in simple jobs the machine has run too slowly. It has also been necessary for the operator to wait until the pusher had completed its return stroke before placing a succeeding stack of labels in front of the pusher for the next feeding and cutting operation. This made the operation of the machine unnecessarily slow.

Summary

According to the present invention, the pusher element, or pusher finger as it will be designated hereinafter, is caused to retract below the level of the table after its return stroke and to project above the table for its pushing stroke. This makes it possible to place a succeeding stack of labels on the table while the pusher is advancing since upon its return stroke it retracts and passes below the stack of labels and when it projects it is in position behind the stack of labels for the next pushing operation.

Since the feed mechanism is operated by a cam and lever system, the stroke is limited and this invention provides a mechanism for increasing the length of the stroke and increasing the speed of the stroke so that it achieves a stroke of twice the length of a prior art machine in the same length of time and thus gives the operator more room to work.

Furthermore, the machine is equipped with a variable speed drive of conventional type so that the speed of rotation of the main shaft can be increased, whereby the operator can run the machine at a speed which is suitable to the particular type of label being cut.

Brief description of the drawings

FIG. 1 is an elevational view with parts broken away of the lower portion of the machine showing the pusher mechanism in position during a pushing stroke.

FIG. 2 is a view similar to FIG. 1 showing the position of parts at the end of the pushing stroke with the anvil rising for the cutting operation.

Description of the preferred embodiment

Figure 3:
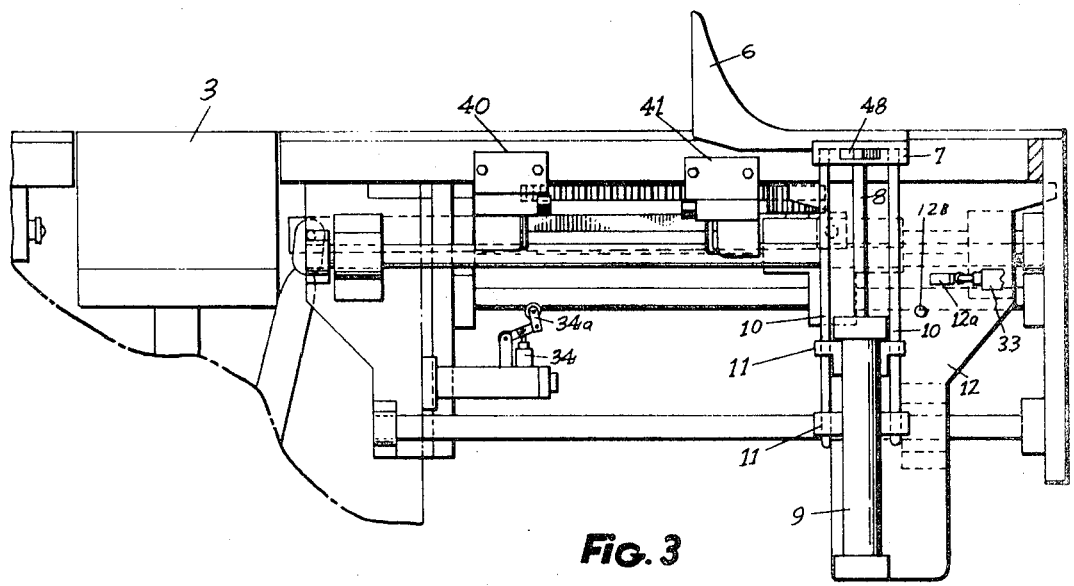
FIG. 3 is a fragmentary view of the feeding mechanism as seen from the rear of the machine during a pushing stroke.

As will be understood by those familiar with die cutting machines of the type herein involved, there is provided a base 1 and an upstanding column 2 which, as is shown in the above mentioned earlier patent, is usually at an angle to the base. An anvil 3 is provided which is attached to a plunger 4 which is mounted for reciprocation in the column 2 of the machine. The machine also has a table 5 (also usually tilted at an angle as shown in said earlier patent) over which the labels are moved from a loading position to a cutting position. The table 5 is provided with a pushing finger 6 which is carried in a member 7. The member 7 is secured to the piston 8 of a double acting air cylinder 9 and is provided with guide rods 10 which pass through holes in the brackets 11 which keep the member 7 in proper alignment. By means of the piston 8, the finger 6 may be raised and lowered as will be described in more detail hereinafter.

The air cylinder and associated parts are carried on a member 12 which is arranged to have reciprocating motion on the guide rods 13, 14 and 15. The link which produces the reciprocating motion of the member 12 is indicated at 16 and is connected by means of the bell crank feed lever 17 which is pivoted at 18 to a cam follower 19. The cam follower 19 is arranged to cooperate with a cam 20 mounted on the main shaft 21 of the machine. A compression spring 22 about the rod 23 which is mounted in an ear 24 on the machine frame is secured to the upwardly extending ear 25 and thus urges the cam follower 19 against the cam 20. Thus, as the main shaft is rotated by means of the pinion 26 and gear 27 (the pinion 26 being driven by the main motor (not shown)), the bell crank 17 is caused to oscillate and thereby reciprocate the link 16. The link 16 carries at its end a freely rotatable pinion 30 and this pinion operates between a rack 31 mounted on the machine frame and a rack 32 mounted on the member 12.

From this description it will be clear that as the axis of the pinion 30 reciprocates, the pinion is caused to rotate because of its engagement with the fixed rack 31 on the machine frame. Since the pinion 30 also engages the rack 32 on the member 12, the latter is caused to move twice the distance and at twice the speed of the axis 30.

Figure 6:
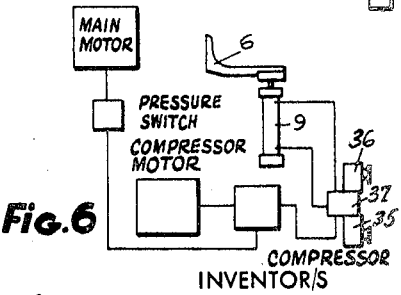
FIG. 6 is a diagram of the fluid pressure system.

A switch 33 (FIG. 3) is arranged to be abutted by the member 12, or an element 12a secured to the element 12, at the end of the return stroke. A switch 34 is arranged to be actuated by an element 12b at the beginning of the return stroke. The switch 34 is actuated by a lever arrangement conventional in switching devices whereby as the member 12b passes over the roller 34a on the forward stroke, the link yields, but when the member 12b abuts the link 34a on the return stroke, it cannot yield and therefore is depressed and actuates the switch 34. The switches 33 and 34 are arranged to energize the solenoids 35 and 36 (FIG. 6) which actuate the valve 37 to cause the finger 6 to be raised and lowered, respectively. Thus, as the member 12 reaches the end of its return stroke (movement to the left in FIGS. 1 and 2 and movement to the right in FIGS. 3 and 4), the switch 33 is actuated to cause the solenoid 35 to operate the valve 37 to raise or project the finger 6 to the position of FIG. 3. In this position the finger 6 can push a stack of labels onto the anvil 3 for a cutting operation. At the beginning of the return stroke, the abutment 12b actuates the linkage 34a and operates the switch 34 to energize the solenoid 36 to switch the valve 37 to cause the finger 6 to be retracted to the position shown in FIG. 4. In this position the finger 6 can move through its return stroke without disturbing a stack of labels which the operator may have placed on the table as soon as the previous stack of labels has been pushed out of the way. By this means the operator is enabled to feed the machine more rapidly and does not have to wait until the end of the return stroke to place a succeeding stack of labels on the table.

Figure 5:
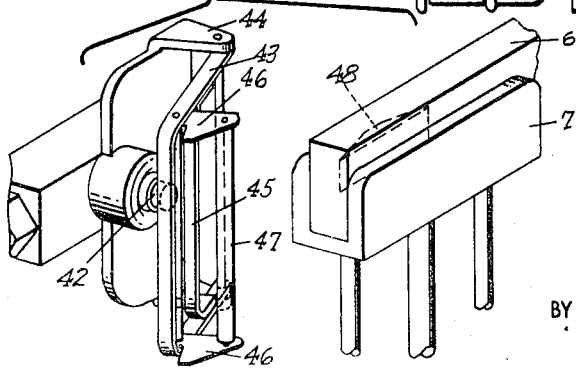
FIG. 5 is an exploded view showing one of the safety switches and the actuating means therefor.

The machine is provided with safety switches to inhibit operation of the machine in either direction in the event of improper functioning of the projecting or retracting mechanism. These safety switches are indicated at 40 and 41 and one of them is shown in detail in FIG. 5. These switches are mounted on the machine frame and comprise an actuating button 42 and a linkage mechanism. A U-shaped link 43 is pivoted to the ears 44 and has a cross bar 45 which engages the switch button 42 when the U-shaped link 43 is pivoted to the left as seen in FIG. 5. A pair of levers 46 are pivoted to the U-shaped member 43 and carry between them the roller 47. The assembly of the levers 46 and roller 47 are spring urged to the position of FIG. 5.

The roller 47 is adapted to be engaged by a cam 48 carried on the member 7. It will be noted that the switches 40 and 41 are oppositely disposed and that the switch 41 is slightly lower in its vertical position than the switch 40. The relative positions of the switches 40 and 41 are such that if the finger 6 is in its proper raised position for a pushing stroke, the cam 48 will pass over the roller 47 of the switch 41 which is oriented as shown in FIG. 5. Since the switch 40 is oppositely oriented, the cam 48, upon abutting the roller 47 of the switch 40, will simply depress the assemblage of the levers 46 and roller 47 without actuating that switch.

Figure 4:
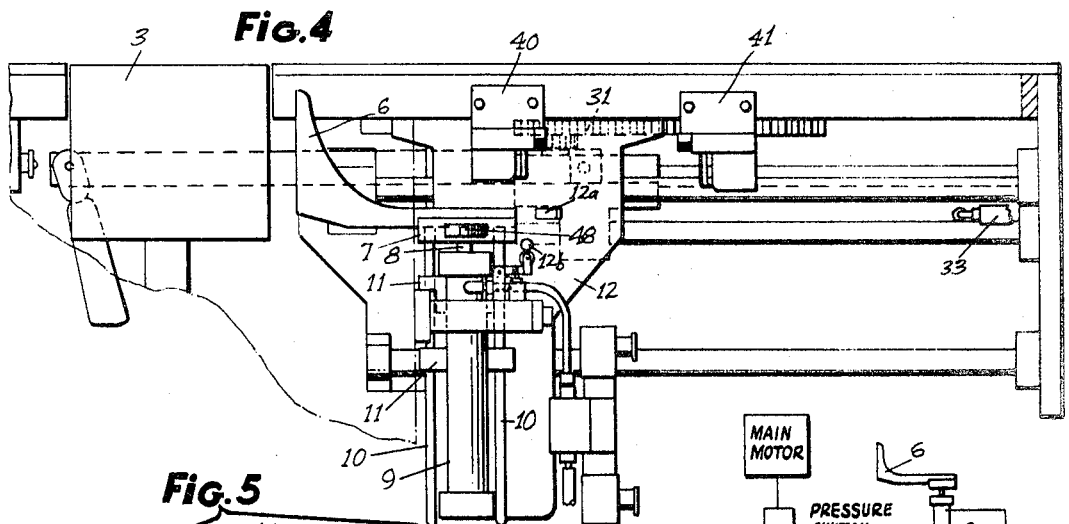
FIG. 4 is a view similar to FIG. 3 showing the position of parts during the return stroke.

Upon its return stroke when the finger is in the position of FIG. 4, the cam 48 will pass under the roller 47 of the switch 40 and will hit the roller 47 of the switch 41 which will simply yield without actuating the switch.

From this description, it will be clear that if the finger 6 is not fully raised during its pushing stroke, the cam 48 will hit the roller 47 of the switch 41 which, since it is oriented as shown in FIG. 5, cannot yield and will therefore actuate the switch to stop the machine. Similarly, on the return stroke if the finger 6 is not fully retracted so that it can pass below the switch 40, it will abut the roller 47 of the switch 40, which is reversely oriented with respect to FIG. 5, so that it it will actuate the switch 42 and stop the machine. The electrical connections for these switches have been omitted for clarity since such connections are within the skill of the ordinary machine designer.

The machine as thus far described enables die cutting operations to be conducted more efficiently and more rapidly since succeeding stacks of labels may be placed on the table without waiting for the pusher finger to complete its return stroke. Also, since the stroke of the pusher finger has been doubled, the operator has more room to work and yet the operation will proceed at the same speed as it would with a stroke of half the length.

To further enhance the efficiency of the operation, the machine main motor is preferably connected to the pinion 26 through a variable speed drive of conventional design such as the well known Reeves variable speed drive. This is shown diagrammatically in FIG. 1 with the motor being indicated at M and the variable speed drive at VSD. Thus, if plain rectangular labels of large size are to be die cut (this being the simplest operation), the operator can cause the stroke of the feeding mechanism and the operation of the anvil to be speeded up, whereas if the operation has to do with the cutting of small complex labels, the speed of the machine may be slowed down to a speed which is suitable for the particular operation to be performed.

It will be clear that various modifications may be made without departing from the spirit of the invention. No limitation is therefore intended other than as set forth in the claims which follow.

The embodiments of the invention in which an exclusive property or privilege is claimed are defined as follows:

1. In a die cutting machine for labels and the like, having a frame including a table, a powered anvil means operating upwardly from the level of said table, die means supported above said table for cutting stacks of labels located upon the said anvil, a pusher means for pushing a stack of labels from a loading position to a cutting position on said anvil, and means for reciprocating said pusher means; said pusher means including a pushing finger, means operative after the completion of the pushing stroke to retract said finger below the surface of said table and to retain it below said surface during its return stroke, and means operative at the completion of said return stroke to project said finger to pushing position above the surface of said table, said retracting and projecting means comprising a double action fluid cylinder having a piston connected to said finger.

2. A machine according to claim 1, including a fluid circuit having valve means to actuate said piston, wherein electrical relays are provided to actuate said valve means, and said relays are in an electric circuit including an actuating switch adjacent each end of the path of travel of said pusher means, and arranged to be actuated thereby.

3. A machine according to claim 2, wherein a safety switch is located to be operated by said finger upon less than full projection during the pushing stroke, and a second safety switch is located to be operated by said finger upon less than full retraction during the return stroke, whereby said machine will not proceed with said pushing stroke unless said finger is fully projected, and will not proceed with a return stroke unless said finger is fully retracted.

References Cited

UNITED STATES PATENTS 3,290,977  12/1966  Brestel et al. _____ 83—467

FOREIGN PATENTS 710,854  6/1954  Great Britain.

ANDREW R. JUHASZ, Primary Examiner

JAMES F. COAN, Assistant Examiner

U.S. Cl. X.R.

83—221, 278, 437; 192—129